United States Patent [19]

Yoshimoto et al.

[11] Patent Number: 4,674,077
[45] Date of Patent: Jun. 16, 1987

[54] DISC REPRODUCING APPARATUS WITH CAROUSEL USING DISC CLAMPING DEVICE

[75] Inventors: Shin-ichi Yoshimoto; Reigo Ando; Takeshi Shirai; Hiroshi Nomura, all of Shirakawa, Japan

[73] Assignee: Nippon Columbia Co. Ltd., Tokyo, Japan

[21] Appl. No.: 641,171

[22] Filed: Aug. 15, 1984

[30] Foreign Application Priority Data

Jan. 26, 1984 [JP] Japan ................................ 59-12898

[51] Int. Cl.$^4$ .......................................... G11B 17/28
[52] U.S. Cl. ....................................... 369/37; 369/32
[58] Field of Search ..................... 369/32, 33, 34, 35, 369/30, 41, 36, 37, 69, 70, 202, 258, 270; 360/33.1, 79, 73; 358/335, 342

[56] References Cited

U.S. PATENT DOCUMENTS

| | | | |
|---|---|---|---|
| 2,796,263 | 6/1957 | Moore | 369/37 |
| 3,690,680 | 9/1972 | Lumney et al. | 369/34 |
| 4,027,336 | 5/1977 | Jordan | 360/73 |
| 4,445,147 | 4/1984 | Kessman et al. | 369/30 |
| 4,519,055 | 5/1985 | Gilson | 369/37 |
| 4,527,262 | 7/1985 | Manto | 369/33 |

Primary Examiner—Raymond F. Cardillo
Assistant Examiner—Robert A. Weinhardt
Attorney, Agent, or Firm—Murray Schaffer

[57] ABSTRACT

Disc playback apparatus is provided with a rotatable carousel carrying a plurality of discs. The carousel is stopped so that a disc to be selected arrives at a predetermined position where it is removed and transferred to the playback apparatus and vice-versa. The carousel has a disc-shaped base and a plurality of disc clampers located on the base in a radial direction. Each of the clampers are formed of a disc support and a clamper member supported by a bearing provided on said disc support and have a convex portion adapted to engage with the bore of said disc. A spring member biases the convex portion of the clamper member so that the disc is held against the disc support and is selectively disengageable against the bias of said spring member so that it may be released from said carousel for transfer to said disc playback apparatus by said transfer means.

5 Claims, 26 Drawing Figures

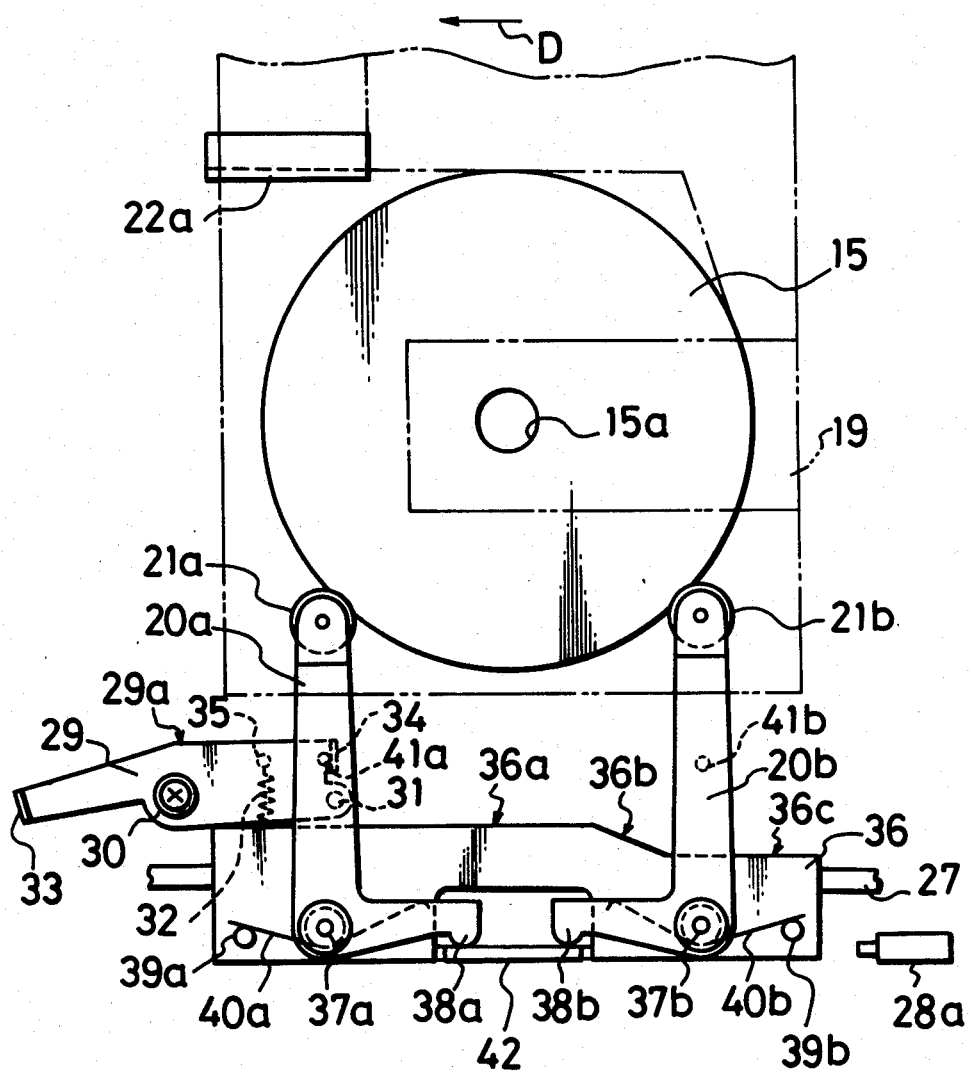

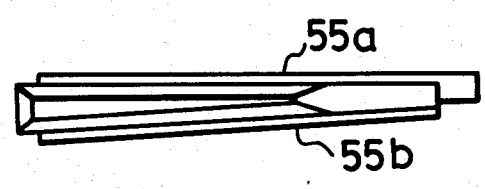
FIG. 13A
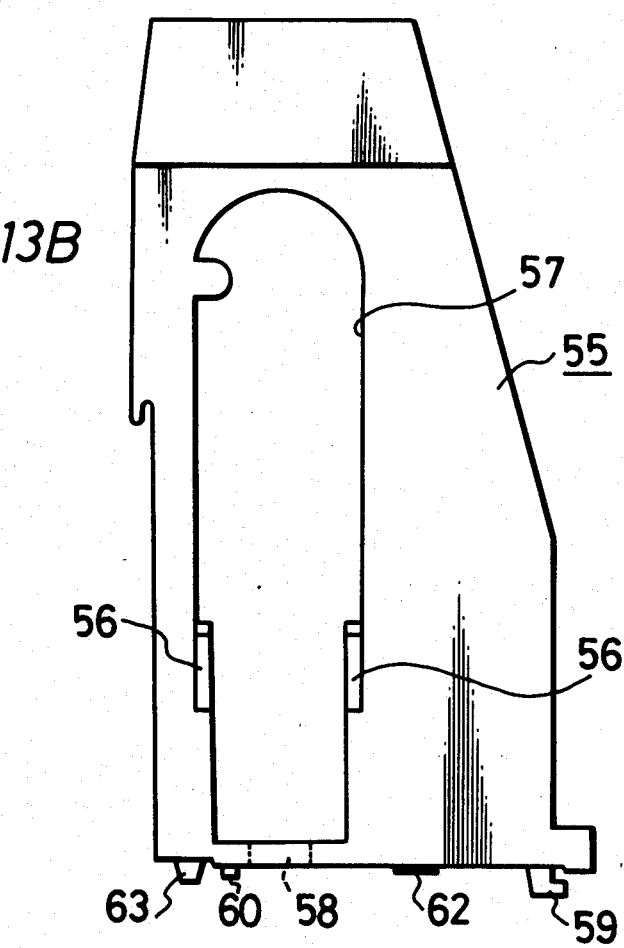
FIG. 13B
FIG. 13C
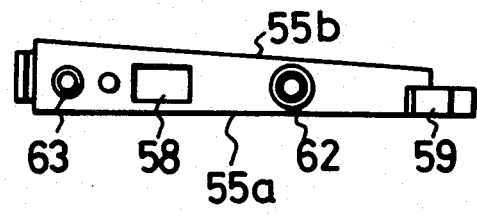

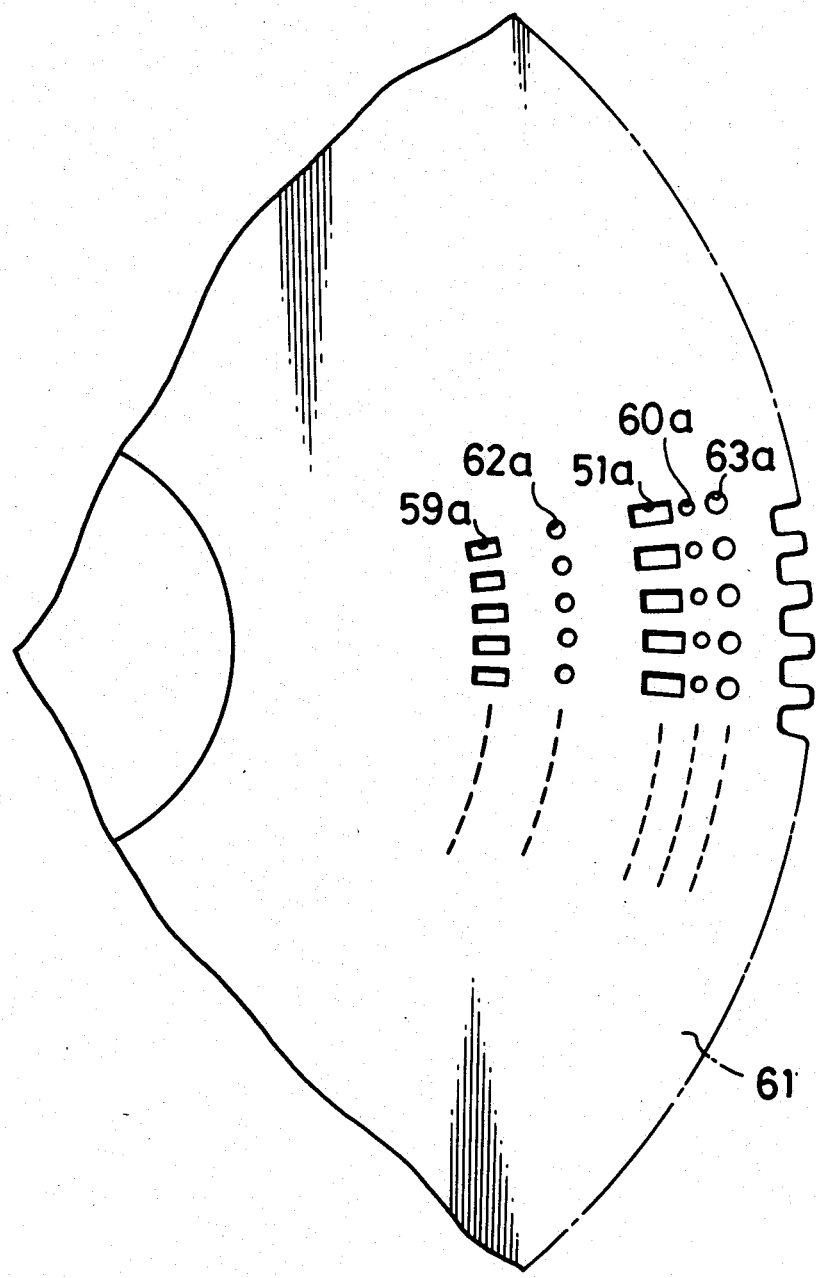

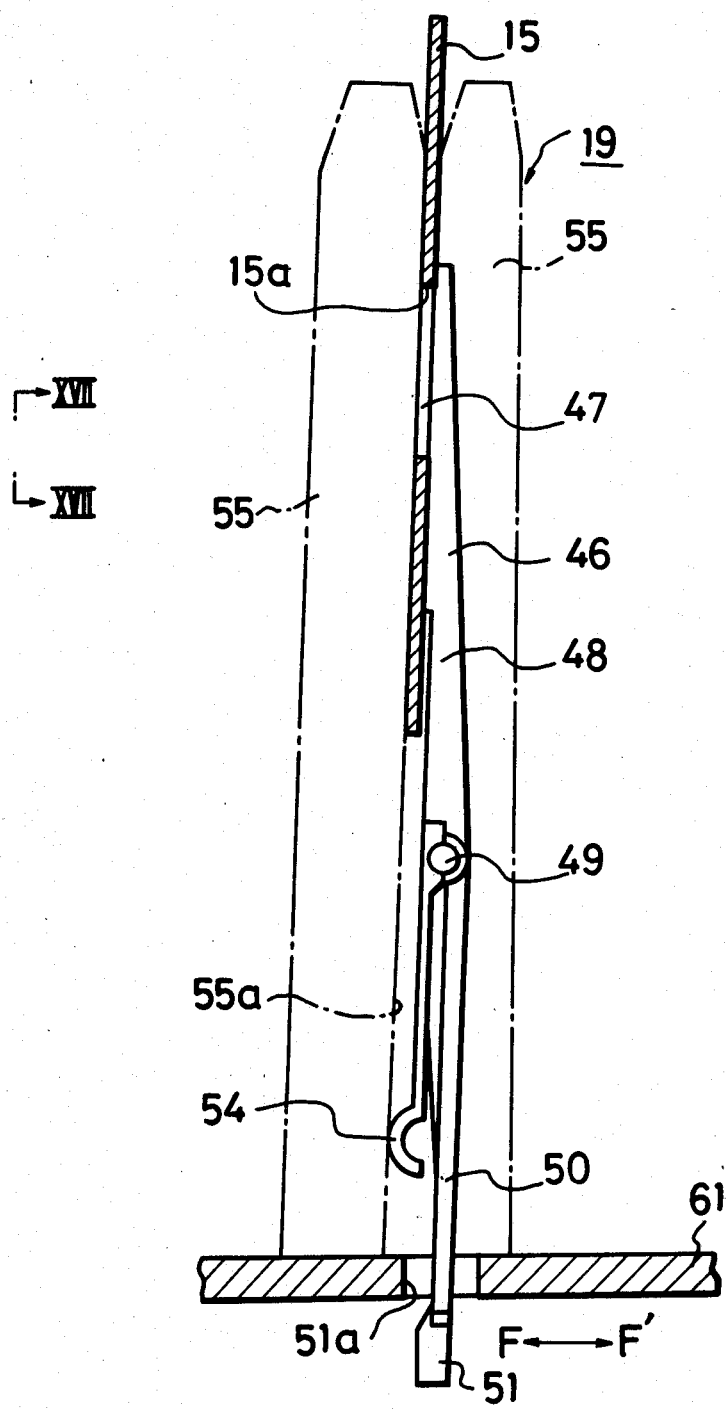

DISC REPRODUCING APPARATUS WITH CAROUSEL USING DISC CLAMPING DEVICE

BACKGROUND OF THE INVENTION

1. Field of the Invention

The present invention relates to recording or disc playing apparatus and, more particularly, to disc transport mechanism for removing a selected disc from a disc storage and carrying means, in which a plurality of discs are located, and then loading the selected disc into the player and subsequently removing the disc and returning it to the storage and carrying means.

2. Description of the Prior Art

Recently, player apparatus for digital audio discs (DAD) has come on the market which can reduce the time in which the information recorded on the DAD is obtained by an optical pickup. In order to store a great deal of information, many discs are required so that it is necessary to frequently select a given disc from amongst the plurality thereof to be loaded into the reproducing means. Thereafter, the predetermined information may be reproduced from the disc at the player device.

For use as a record player or the like, it is proposed that automatic playing apparatus called a record changer be provided and that the disc be stored and carried in an apparatus called a carousel. The carousel may contain any type of medium such as discs, cassettes and slide films radially arranged within a cylindrical disc compartment. The carousel includes at its center portion a drive shaft coupled to a drive motor capable of being stopped at a predetermined position so that the transport means may thereby take up the medium from the carousel for transport to the player means for reproduction or playback.

FIGS. 1 and 2 show a prior art cassette carrier, in the form of a carousel A in which many cassettes or the like are radially arranged to be individually removed thereform. The carousel is approximately cylindrical in shape and includes a plurality of compartments 3 each extending in a radial direction and having an open portion 1 at the exterior edge through which a respective tape cassette 2 may be inserted and/or removed. The radially disposed compartments are arranged with equal spacing or distance between each other and have their bottoms formed as rectangular guide apertures or slits 4 of narrow width in parallel to the direction along which the cassettes are removed. The inner ends of the guide slits 4 communicate with cut outs 6 formed through an inner cylindrical hub portion 5. Pins 8 protrude upward from a rotating spindle 9 and are inserted into guide apertures 7 extending axially through the inner cylindrical hub portion 5 so that when the spindle 9 is rotated, the carousel A will also rotate. A threaded screw bar 10 and a pair of take-up pins 11 mounted on the screw bar, is disposed at the bottom of the carousel A.

When removing the cassette 2 from within the carousel A as seen in FIG. 11, the screw bar 10 is rotated to allow the spaced pins 11 to grip the cassette at its inner and outer ends, so that when the screw bar 10 is subsequently rotated, the cassette may be moved in the direction of arrow X. Thereafter, the cassette is loaded into a tape cassette player/recording apparatus (not shown) and then played. After the playback, the tape cassette 2 is again gripped by the male members 11 and moved in the direction opposite to that shown by the arrow X so as to be returned to the selected compartment 3 within the carousel A.

In the above construction, the carousel A is disposed horizontally and the bottom of the carousel takes up a large horizontal area. Also, since the tape cassette 2 must be gripped and released within the compartment 3 as well as at the player device it takes a disadvantageously long time for the cassette 2 to be removed and inserted. Moreover, the construction of the carousel A is complicated making the loading of the medium quite difficult and also requiring partition plates to separate the various compartments 3. It was previously proposed in U.S. Pat. No. 3,402,935, assigned in common, to provide a record player and the like having a clamper serving as a fly-wheel in which a bearing having a concave portion is formed on a disc-shaped base from which a shaft formed on the clamper protrudes. A record, i.e., a disc is clamped by the clamper and the clamper is supported by the concave portion of the bearing and is rotated at the external peripheral edge of the clamper. However, the record clamper serving as a fly-wheel construction has a disadvantage that a plurality of discs cannot be disposed on the base and, therefore, a high density cannot be obtained and also that the base cannot be disposed vertically.

Further, in order to move an object such as the disc linearly, a driving apparatus had been widely used in which a rack gear is the crucial element. The rear gear is manipulated by a moving member such as a gear or pinion. A specific example of such as apparatus is shown in FIG. 3 wherein a slider 36 having a rack gear 43 formed along the full length of its lower edge is provided, the full length in cm being indicated as L1. To move a disc 15 from one position to the position 15' shown in phantom lines, a gear 45, fitted to the drive shaft 45b of the motor 45a, engages with the rack gear 43. When the motor 45a is rotated, it is possible to move the object to be carried by a distance D1 which approximately corresponds to the length L1 of the rack gear 43. If the distance over which the disc 15 is to be moved is increased, the length of the rack gear 43 must also be increased.

OBJECTS OF THE INVENTION

Accordingly, it is an object of the present invention to provide an improved disc player apparatus which obviates the disadvantages inherent in the prior art disc player apparatus.

It is another object of the present invention to provide a disc player apparatus including a disc pickup means for taking up at random a disc from a disc carrying means in which a plurality of discs are located so as to load the selected disc into or remove the same from the player means which transport means is from the longitudinal type to reduce the area occupied by the transport means.

It is another object of the present invention to provide a disc player apparatus having a disc holding means which can reduce the time necessary during which the disc being transported and being carried from and to the carousel and/or the player apparatus.

It is yet another object of the present invention to provide a disc player apparatus having a clamp, namely, a disc holding mechanism which can easily be mounted or dismounted from the exterior of the disc and from which the disc cannot be dislodged or dropped even if the clamper is held in the vertical position.

It is a further object of the present invention to provide a disc player apparatus having a disc holding mechanism formed of a clamper and a disc support to hold the clamper without an intermediate partition.

It is still a further object of the present invention to provide a disc player apparatus having a simplified disc holding mechanism employing a releasing device whereby the disc holding mechanism can be released in synchronism with a carousel positioning mechanism.

It is another object of the present invention to provide a disc player apparatus having a disc moving means which can increase the moving distance of a carrying rack gear whereby the disc may be transported into or from the reproducing apparatus without increasing the length of the carrying rack.

It is still a further object of the present invention to provide a disc player apparatus capable of automatically restoring the number of revolutions or speed of the disc driving means to that speed before the same had been varied so as to correct the drive and allow the next user to have a normal interval.

It is yet another further object of the present invention to provide a disc player apparatus having the reproducing signal switching means which includes switching apparatus allowing for the playing of background music just after the playing of a specifically requested program is completed.

According to the present invention, there is provided disc player apparatus comprising:

a. a disc carrying means in which a plurality of disc are held;
b. a disc player means; and
c. a transferring means for taking up one of the discs from the disc carrying means and transferring the selected disc to the disc player means or taking up the selected disc from the disc player means and transferring the same to the disc carrying means, the disc carrying means being formed as a longitudinal system with the disc player means being disposed in front of the disc carrying means.

Other objects, features, and advantages of the present invention will become apparent from the following description taken in conjunction with the accompanying drawing through which similar references designate the same elements and parts.

BRIEF DESCRIPTION OF THE THE DRAWINGS

FIGS. 8–10 are each plan views explaining sequentially the operation of the disc transport device according to the present invention;

FIGS. 13a, 13b and 13c are respectively top, front, and bottom views of a disc support;

FIG. 14 is a schematic view illustrating an arrangement of the holes in the carousel base to which the disc clampers of the present invention are implanted;

FIG. 16 is a cross sectional view schematically illustrating the assembly of the disc clamper;

DESCRIPTION OF THE PREFERRED EMBODIMENTS

The disc transport mechanism according to the present invention will hereinafter be described in detail in combination with an exemplary playback recording device.

Figure 4:
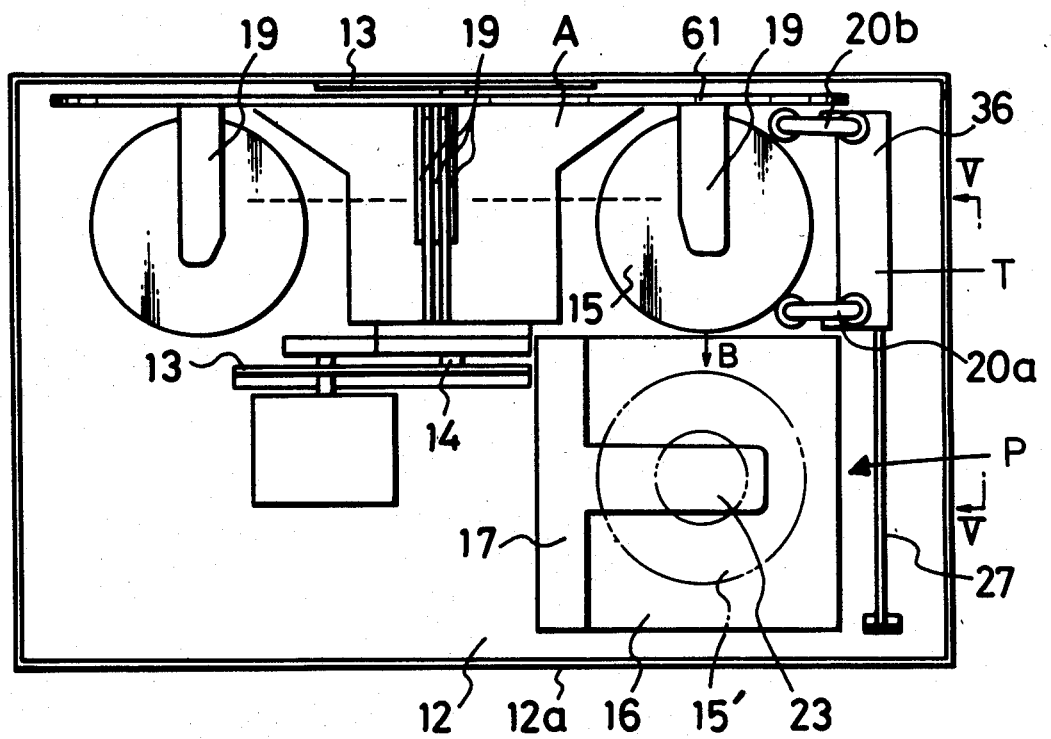
FIG. 4 is a plan view illustrating the location of the carousel playback device and transport apparatus of the present invention.
Figure 5:
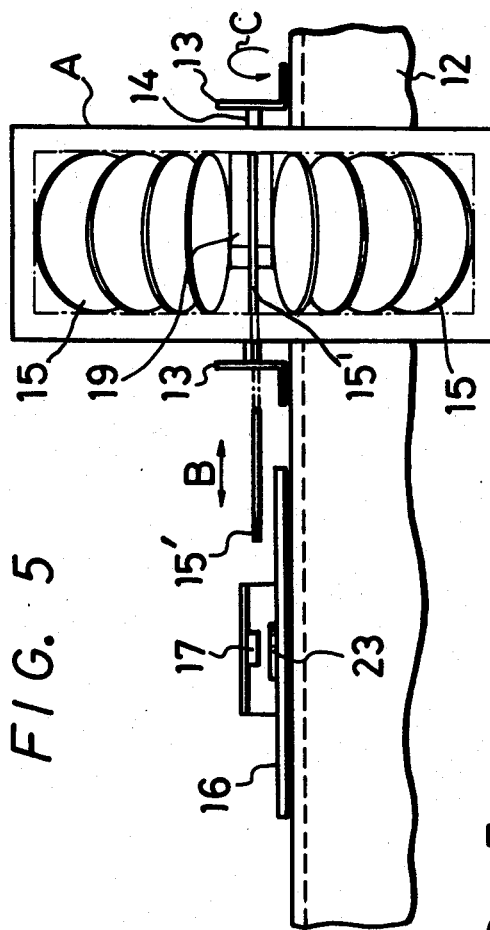
FIG. 5 is side elevational view taken along line V—V of FIG. 4.

The overall arrangement is first schematically shown in FIGS. 4 and 5 in which a carousel A and a player recording device P are mounted on a chassis 12. The carousel A is of the drum type and is vertically oriented between a pair of bearing posts 13 in which the central axial shaft 14 of the carousel A is horizontally journaled. The carousel A is defined by a base 61 fixed mounted on the shaft 14 and on which a plurality of compact discs 15 (100 in this example) are supported by individual disc holders 19 mounted along the outside periphery of the base 61. The player device P is disposed horizontally on the chassis 12 laterally of the carousel A so as to be available from the front of the chassis 12a, thus facilitating the maintenance and inspection of the player device P. The player device P comprises a deck 16 constructed such that the specifically chosen disc 15' can be played, as well, by the manual operation from the front side 12a of the chassis.

A disc transport mechanism T (shown in detail in FIGS. 6–11) is located along the front side 12a of the chassis 12 and is employed to move a selected disc 15' from the carousel A to the player device P.

Figure 6:
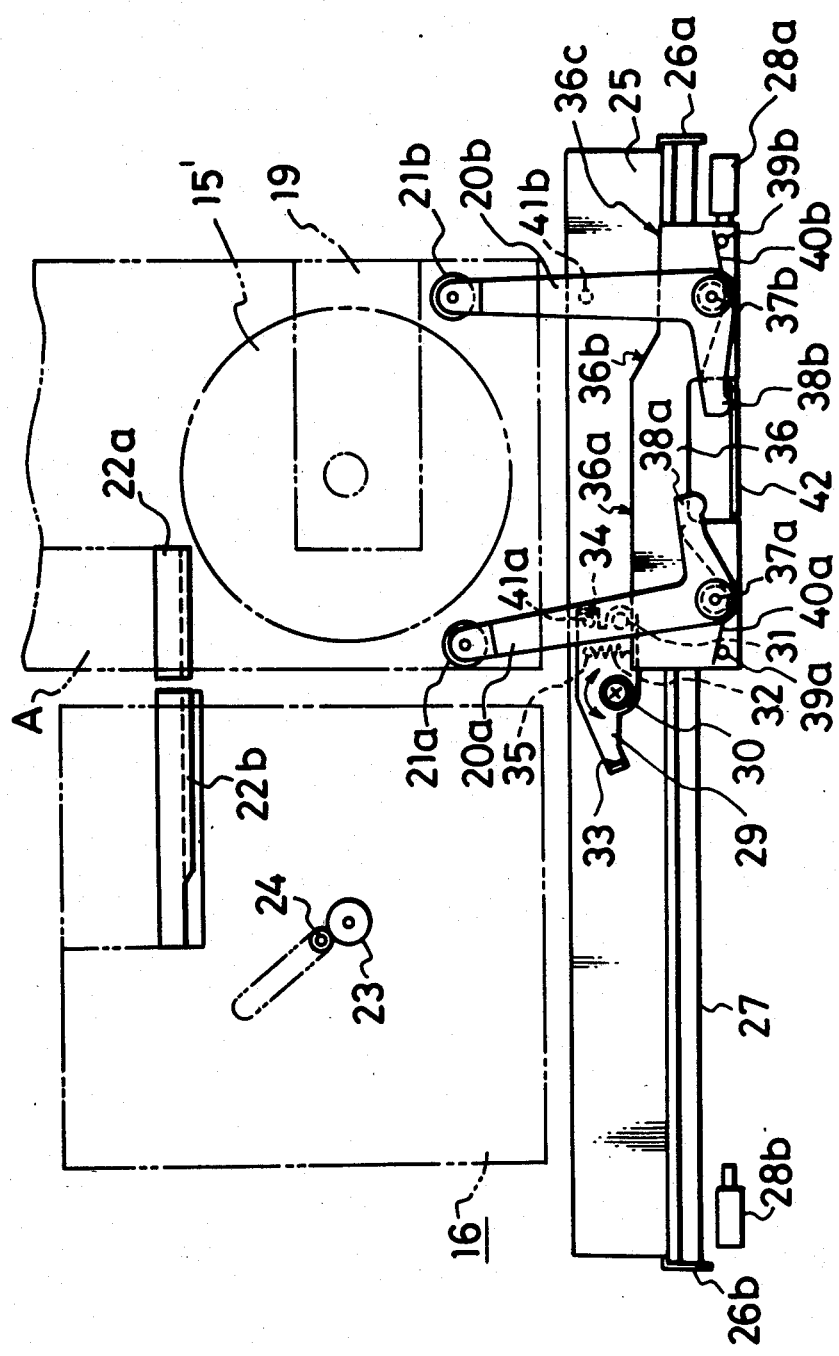
FIG. 6 is an enlarged plan view of the apparatus shown in FIG. 4 illustrating the transport of a disc.

As seen in FIG. 5, the disc 15', initially housed in the carousel A, is rotated (arrow C) by the carousel A so as to lie in a horizontal position above the surface of the chassis 12 to be presentable to the transport T. The transport includes a slider 36, movable on a rail 27, the slider 36 having a pair of arms 20a and 20b which grip between them the selected disc 15' so as to move the disc horizontally in the direction of arrow B, presenting the disc 15' with its central aperture 15a positioned over the spindle 23 of the player device P. As seen in FIG. 6, located to the rear of the player device P and spaced from the rail 27 by the width of a compact disc, are a pair of disc guides 22a and 22b arranged vertically with respect to each other to receive the edge of the disc being held by the arms 20a and 20b. The guides 22a and 22b are substantially C-shaped in cross section and extend from the carousel A to the player device P so that, as the disc 15' is being transported in the horizontal condition, it is supported not only by the arms 20a and 20b, but also by the guides 22a and 22b. Upon reaching the spindle 23, it is lowered onto the spindle by transfer holder 17, being placed thereby into the play mode. As seen in FIG. 6, the player device P also includes an optical pick-up head 24 movable in the radial direction of the disc 15 so as to read the information thereon, as well as the appropriate motor drive and transmission to rotate the spindle or deck and the optical pick up head.

The disc transport T is now described in detail with greater reference to FIGS. 6 to 11. A sub-chassis 25 extends between the undersides of the carousel A and the player deck 16. The rail 27 which supports the slider 36 is stretched between upstanding bearing members 26a and 26b formed integrally with the sub-chassis 25. A pair of sensor switches 28a and 28b are disposed at the ends of the rail 27 to detect when the slider 36 is slid into either of these extreme end position. A stop bracket 29 of short length relative to the sub-chassis 25 is povitally mounted at substantially the center portion of the sub-chassis 25 (i.e. the center of the rail 27) to be swingable on the sub-chassis 25 about vertical axle 30. The stop bracket 29 is provided at its respective ends with first and second stop members 33 and 34, each of which extends upward to give the stop bracket 29 a substantially L shape configuration at both ends. Adjacent the second stop member 34 and somewhat forward of it is mounted a cam roller 31. A pin 35 extends upwardly from the stop bracket 29 and a spring 32 is engaged at one of its ends with the pin 35 and at its other end to a fixed portion (not shown) of the sub-chassis 25 to bias the cam roller 31 in contact with an edge of the slider 36 provided with three cam surfaces 36a, 36b and 36c. The first and third cam surfaces 36a and 36c are flat, while the intermediate second cam surface 36b is inclined and acts to communicate the first and third flat surfaces with each other.

Each of the first and second arms 20a and 20b of the disc carrier 36 are respectively formed as L shaped and inverse L shaped levers being provided at the ends of their long legs with rollers 21a and 21b respectively, which are adapted to engage the peripheral edge of a disc 15. Each of the arms 20a and 20b are rotatably suported at their apeces on the slider 36 by pivot shafts 37a and 37b and are provided at the ends of their short legs with engaging detents 38a and 38b with are respectively biased to engage a plate 42 extending upwardly from the slider 36 by springs 40a and 40b. The springs 40a and 40b are respectively coiled about the pivot shafts 37a and 37b and have one end abutting against a fixed pin 39a and 39b which pins are integral with the slider 36 and their other ends bearing against the short legs near the detect 38a and 38b. In this manner the disc carrier arms 20a and 20b are respectively biased in the clockwise and counterclockwise direction so that their detents 38a and 38b would normally engage the upstanding plate 42. Stop pins 41a and 41b are respectively fixed on each of the legs of the first and second disc carrier arms 20a and 20b so as to extend downwardly toward the direction of the sub-chassis 25 as seen in FIG. 6.

Figure 1:
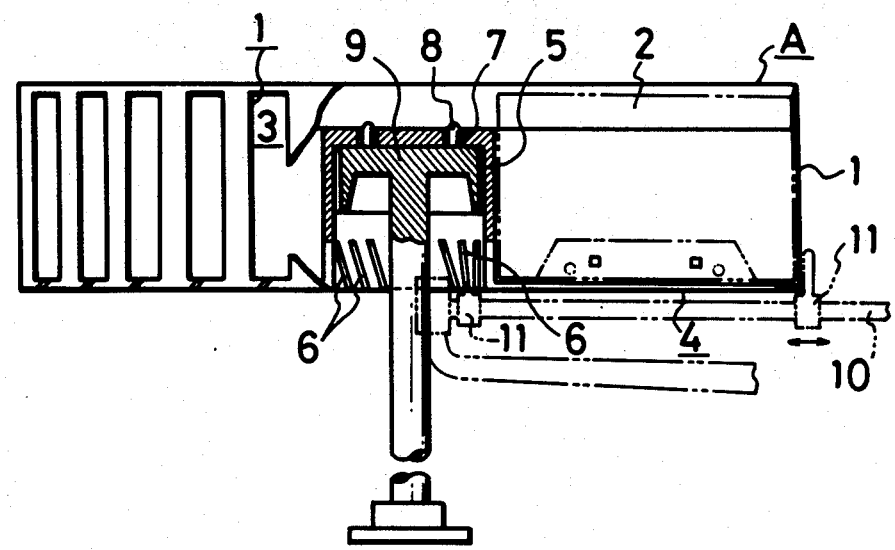
FIG. 1 is a partially cross-sectional side view showing a conventional carousel for carrying tape cassettes.
Figure 2:
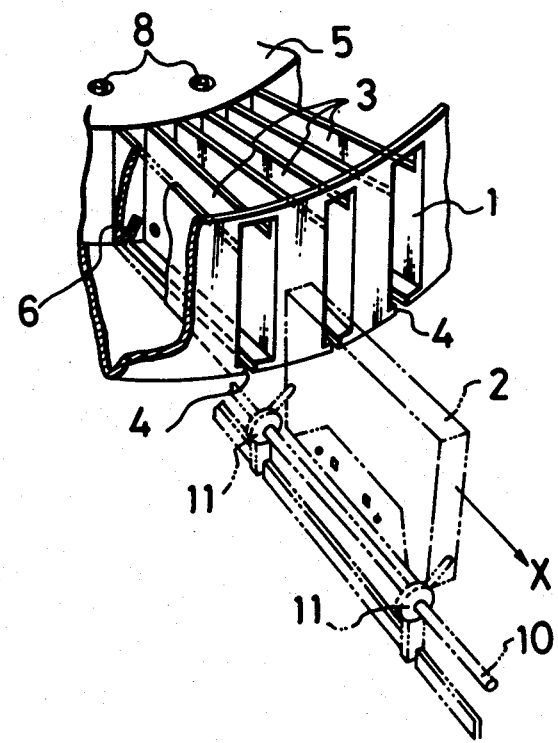
FIG. 2 is a perspective view, greatly enlarged of the compartments of the carousel shown in FIG. 1.
Figure 3:
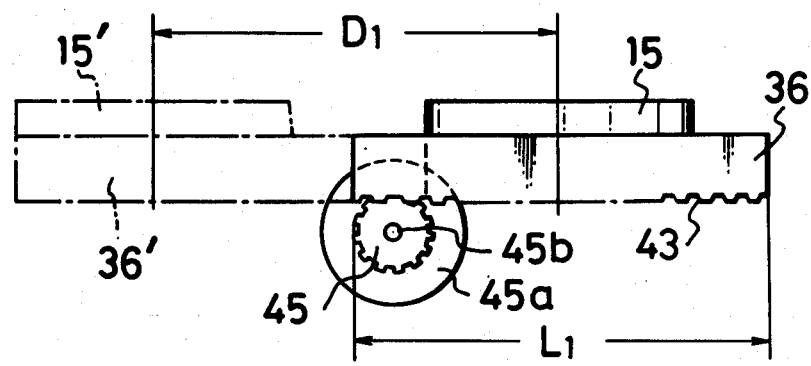
FIG. 3 is a side elevational view schematically showing the drive means of a conventional disc player apparatus.
Figure 7:
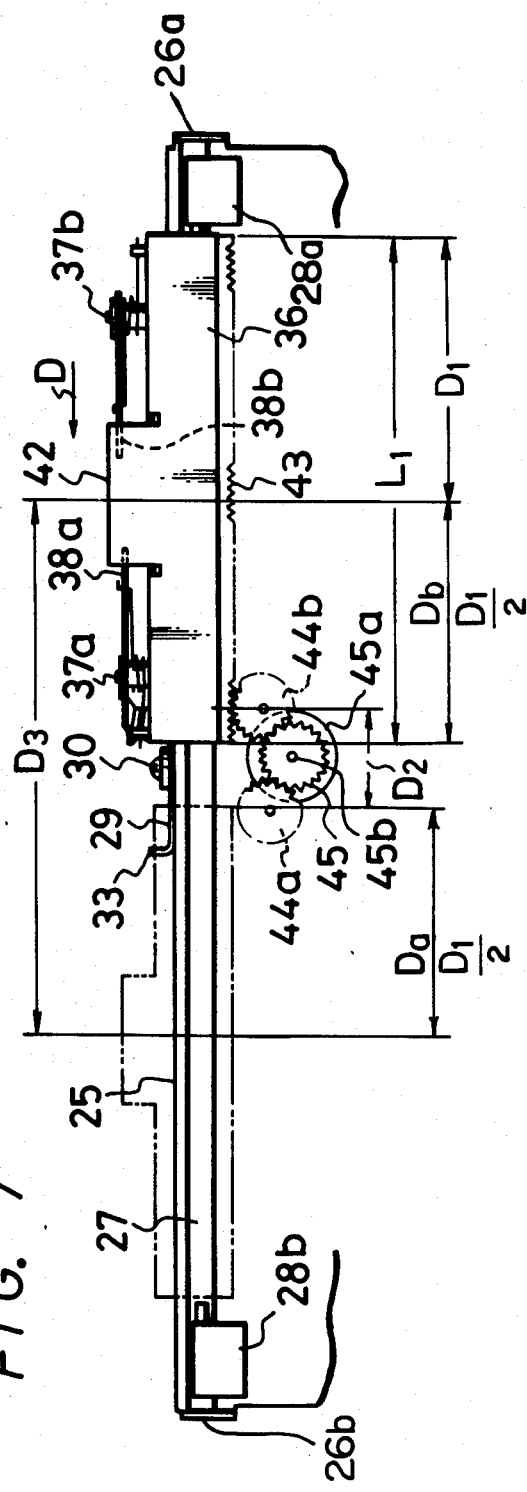
FIG. 7 is a side elevational view of the apparatus shown in FIG. 6.

As seen in FIG. 7, a rack 43 of the same length L1 as that shown in FIG. 3 is integrally formed with the lower edge of the slider 36. A first and second drive pinion 44a and 44b are disposed beneath the rack gear 43 and spaced from each other at a predetermined pitch D2 in a manner to engage with the rack 43 as the rack moves over each of them. The first and second pinions 44a and 44b mesh simultaneously with a main drive gear 45 which is directly coupled to a drive shaft 45b of a drive motor 45a, the activation of which can thus be translated to reciprocate the slider 36 in the direction shown by the arrow D. According to this arrangement, it is possible to move the slider 36 over a distance D3 transporting the selected disc 15' from the carousel A into alignment with the spindle 23 of the player device P. The distance D3 equals the distance D1 as seen in FIG. 3 (i.e. the approximate length L1 of the rack 43) and the additional distance D2 which is the pitch space between the first and second drive gears 44a and 44b, as compared with the prior art. Actually, the rail 27 and the rack 43 are formed so that the slider is also capable of a very small amount of travel beyond this distance, in order to reach the limit stops 28.

In operation, initially, the carousel A is rotated about the axis of its central shaft 14, as shown in FIGS. 4 and 5, so that a specified disc 15' from those discs 15 accommodated within the carousel A is brought to the horizontal position in front of the transport T. The slider 36 is at the same time positioned in front of the carousel A, and the pin 41a of the first disk carrier arm 20a is engaged with the second engaging member 34 (to the right in the drawing) of the stop bracket 29 as seen in FIGS. 6 and 7. As a result, the first disc carrier arm 20a is rotated counterclockwise about its pivot shaft 37a, contrary to the action of the biasing spring 40a, so that this first carrier arm 20a is spread at an angle to the second disc carrier arm 20b. At the same time the second disc carrier arm 20b is in its normally biased condition with its detent 38b in contact with the stop plate 42 perpendicular to the rail 27, being biased by the action of the spring 40b. As a result, the selected disc 15' can be received between the thus open carrier arms 20a and 20b.

Under this state, the motor 45a is activated causing the second drive gear 44b to move the rack 43 to the left, in the direction shown by the arrow D. This immediately releases contact between the stop pin 41a and the second engaging stop member 34, permitting the first carrier arm 20a to rotate about its axle shaft 37a, in the clockwise direction, causing the roller 21a at the tip of the first gripping arm 20a to approach the lower left hand external peripheral edge of the disc 15'. Simultaneously, the roller 21b of the second gripping arm 20b is carried by the slider 36 parallel to the direction of arrow D so as to move into engagement with the lower right hand external peripheral edge of the disc 15 as shown in FIG. 8. Whereupon the disc 15' is grasped by both rollers 21a and 21b.

In the foregoing condition the first and second arms 20a and 20b become and are maintained substantially parallel to each other and hold the disc so that on further movement of the slider 36, the selected disc 15' is moved horizontally in the direction of the arrow D with its upper end being placed in support along the guide groove 22a.

Figure 11:
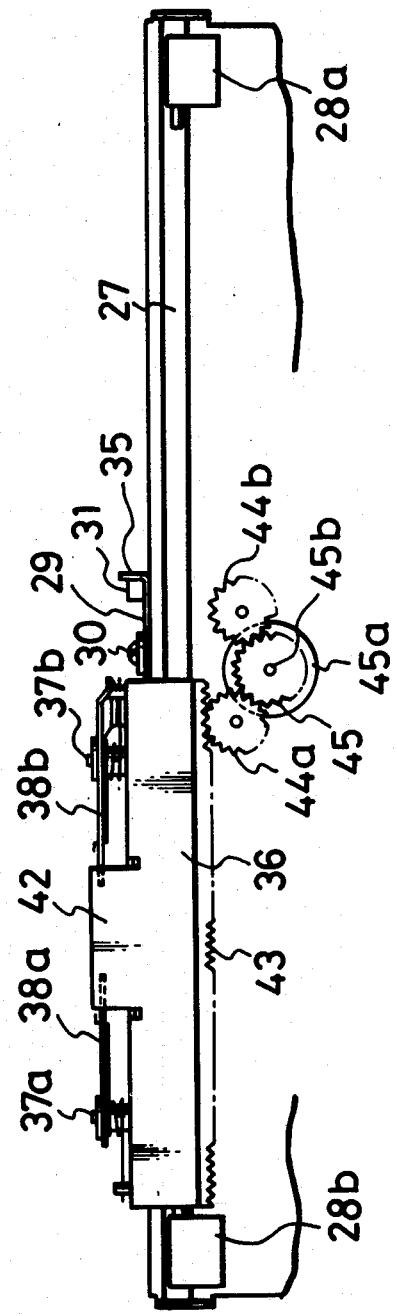
FIG. 11 is a side view of the apparatus shown in FIG. 10.

As the rack 43 passes over the second (right) drive pinion 44b, it engages with the first (left) drive pinion 44a and eventually is released from engagement at its rear end with the second drive gear 44b to assume its ultimate transfer position in front of the player device P as shown by the two-dot phantom line in FIGS. 7 and 11. It will be seen from FIG. 7 that the disc 15' is made to traverse a total distance D3 which is equal to the distance D1 and the additional D2. While in this embodiment the movable member (i.e. the slide 36 and/or the disc 15') is dependent upon the movement of the rack 43, it is possible to replace the rack and pinion drive with a sliding member activated by a pulley drive mechanism. The distance D2 may be further enlarged by increasing the numbers of pinions, pulleys or other actuating means employed intermediate the carousel C and the player device P.

Figure 9:
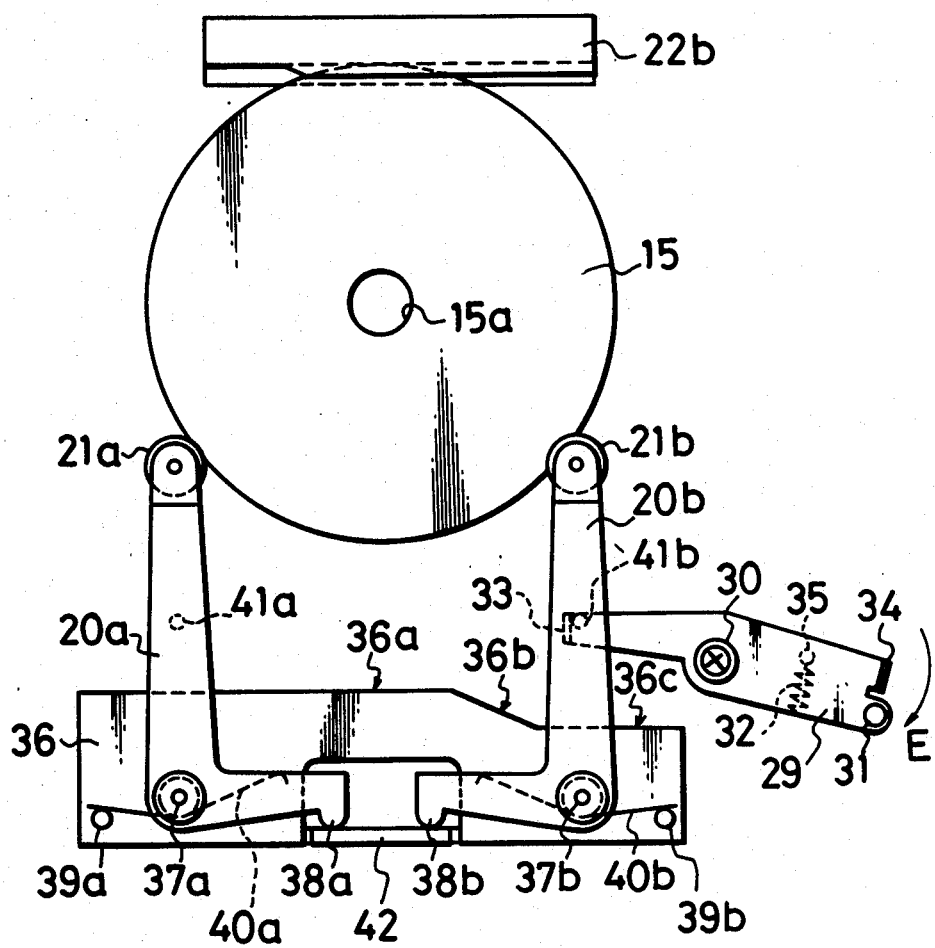
Figure 10:
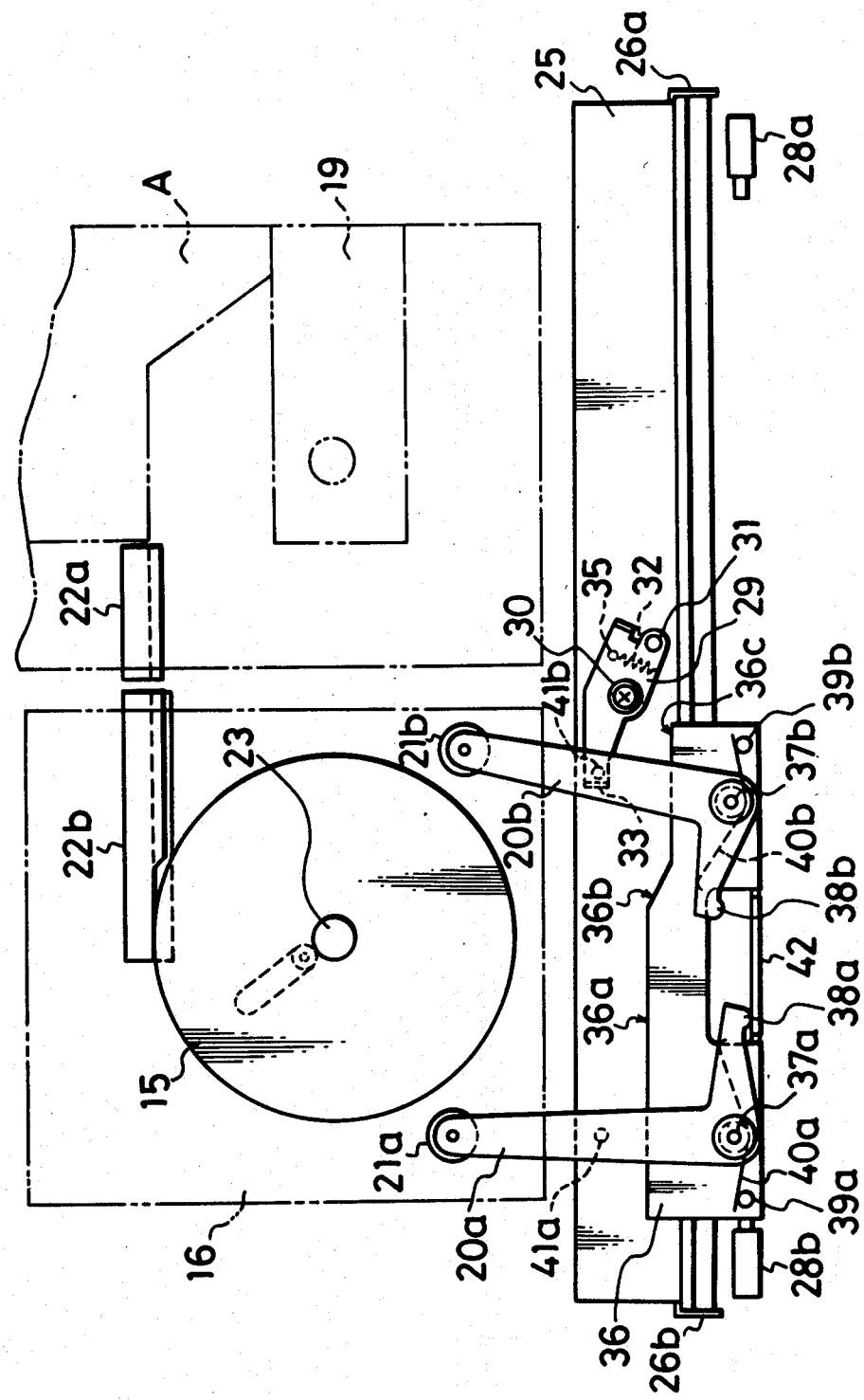

In the initial period of the traverse of the slide 36, the cam roller 31 located on the stop lever 29, is in contact with the edge of the slide 36 riding initially on the first flat can edge 36a. In this condition, the stop lever 26 is arranged so that the pin 41a located on the first (left) disc carrier arm 40a remains on a level with the second engaging member 34 of the stop lever 29. When, however, the slider 36 moves so that the roller 31 falls onto the intermediate inclined cam surface 36b, the stop lever 29 is permitted to pivot about its axle 30 in the clockwise direction arrow E, so as to be biased in a condition angular to the second gripping arm 40b. In this angular condition the first engaging stop member 33 rises above the pin 41a while the second engaging stop member 34 falls below the pin 41a. As a result, the first carrier arm 20a is allowed to move freely from right to left beyond the stop bracket 29. On the other hand, the stop pin 41b on the second (right) disc gripping arm 20b will be at a height sufficient to pass over the upper edge 29a of the stop lever 29 above and out of the way of any possible contact with the second (right) engaging member 34. The stop lever 29 eventually assumes a position, having been rotated in the clockwise direction E, as shown in FIG. 9, wherein its first engaging member 33 is raised to the level of the stop pin 41b so that after the carrier T makes its traverse from the carousel A to the transfer position in front of the player device P, the stop pin 41b on the second disc gripping arm 20b engages the now elevated first engaging member 33 as shown in FIG. 9. At this transfer position the center hole 15a of the selected disc 15' substantially coincides with the center of the spindle 23 and so long as the second gripping arm 20b and the stop bracket 29 are thus interengaged the disc 15' cannot be further advanced, to the left in the direction of the arrow D. At this point the disc 15' is capable of being grasped by the holder 17. The slider 36 can nevertheless still be advanced a short distance in the direction of the arrow D until it reaches the stop 28b as a result of which it separates from the disc 15' and the second arm 20b is caused to rotate in the clockwise direction separating the roller 21b from the external peripheral edge of the selected disc 15' releasing the disc 15' also from the roller 21a of the first disc gripping arm 20a, and the disc 15' is thereby permitted to fall or be lowered by the holder 17 onto the spindle 23. When the necessary spacing or distance is established to permit the arms to open, the second sensor switch 28b is operated to stop the drive motor 45a arresting any movement of the sliders 36. At this time the disc 15 is located on the deck 16 of the player device P and the operation of the read head 24 initiated.

When the selected disc 15' is to be taken up from the player deck 16 and returned to the carousel A, an operation opposite to the above is carried out until the right side of the slider 36 contacts the first sensor switch 28a arresting the drive motor 45a thereafter 15' is grasped by a holder 19 and placed back into the carousel A at its predetermined position.

With the above construction, since the disc 15' can be grasped and detached from the transport carrier T, without any intermediate transfer device it is possible to put the disc directly into the playing mode or returned the disc directly to the carousel A from the carrier T. Thus, the time during which the disc is held between the carousel and the player, or the time required for releasing the disc from one to the other is considerably reduced. Moreover, in the prior art it was necessary in order to move the disc a distance D3, as shown in FIG. 7 to have a rack was required to have a length D1 plus D2. On the other hand according to the present invention, a rack having a length that is less than D1 plus D2 can be employed to move the disc over the extra distance.

Figure 12A:
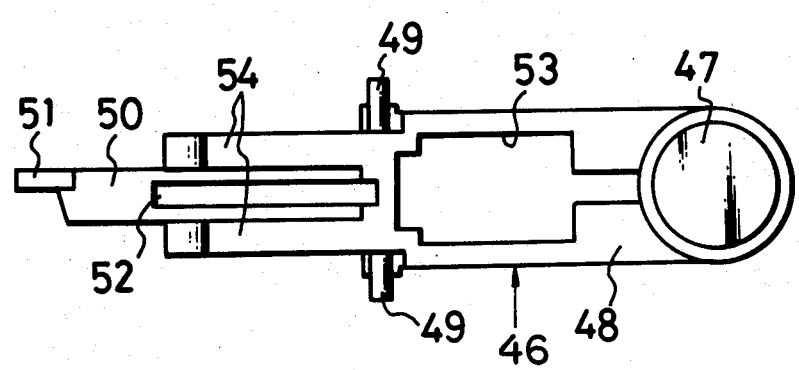
FIGS. 12a, 12b and 12c are respectively front, side, and rear views of a clamper for securing a disc in the carousel of the present invention.
Figure 12B:
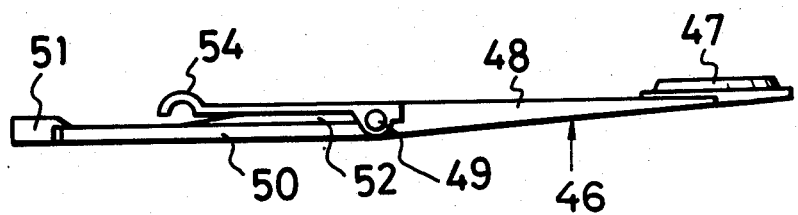
Figure 12C:
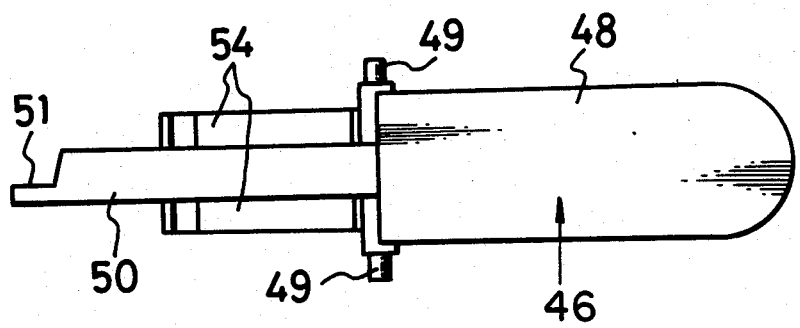
Figure 15:
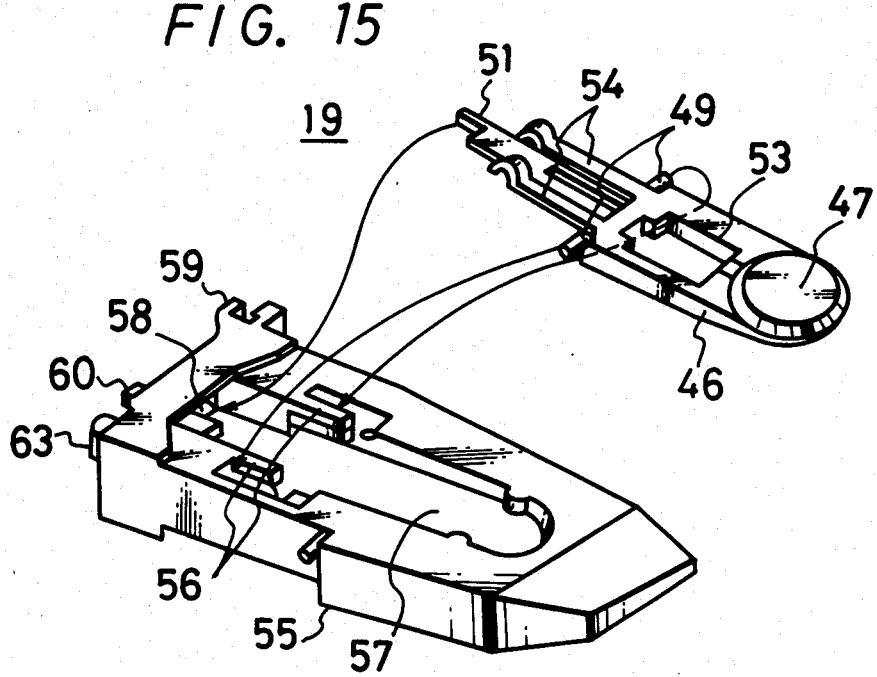
FIG. 15 is a perspective view of the disc clamper and the disc support.

FIGS. 12A–12C illustrate in detail, the disc holders 19 mounted about the periphery of the base 61 of the carousel A. The holder comprises an elongated thin flat arm 46 made of synthetic resinous material. Having mounted substantially along its center perpendicular to the longitudinal direction of the arm, a pivot shaft 49. At the extreme end of the forward portion 48 of the arm 46 is a convex plate like portion 47 adapted to fit within the center aperture 15a of a selected disc (see FIG. 9). The section 50 of the arm 46 to the rear of the pivot shaft 49 terminates in a tip or free end having an operation member 51. A rib 52 is formed along the rear portion 50 extending upward above the plane of the arm 46, while the upper surface of the forward portion 48 of the arm 46 is concave forming a resilient base from which extends rearwardly a pair of spring like arms 54. The arms 54 are pivotally attached to the shaft 49 to apply a pressing force upon the selected disc which is held between the convex portion 47 and the back surface of an adjacent disc support member 55 as seen in FIGS. 13a–13c. Except for the spring arms 54 the holder is integrally molded from the plastic material as described before. The spring members 54 can be independently made of metal such as beryllium, phosphor bronze or the like, if necessary.

FIGS. 13A–13C illustrate the support 55 which acts with the holder 19 shown in FIGS. 12A–12C. As seen, the disc support 55, made of synthetic resinous material, is formed in horizontal cross-section like a wedge, while in vertical cross-section it has the shape of a five sided figure. The wedge shape form is formed by providing the rear surface 55a flat while the front surface 55b is inclined with respect to it, (compare FIGS. 13A and 13C). Extending in the vertical direction, as seen in FIG. 13b the support 55 is provided with an elongated through hole 57 having an arch-shaped top and bearing members 56 along its side edges which are adapted to support between them, the pivot shaft 49 of the holder arm 46 (see FIGS. 12a–12c) while the through hole 57 engages the arm 48 and the spring member 54 of the holder 46. A square through hole 58 is formed from the bottom surface of the support 55 inwardly in communication with the vertical through hole 57. Further, protruding from the bottom surface of the support 55 is a positioning projection 59 and an anti-rotation pin 60 which are respectively fit into a square aperture 59a and a through hole 60a formed in the base plate 61 of the carousel A, as shown in FIG. 14. Taps 62 and 63 respectively protrude also from the bottom surface of the support 55 which are inserted fixedly into through holes 62a and 63a on the base plate 61. The support 55 is thereafter fixedly attached to the base plate 61 by screw means passing through the through holes 62a and 63a, also seen in FIG. 14.

The disc holder assembly 19, each consisting of the clamp arm 46 and the disc support 55, is inserted into one of the aligned pair of square apertures 51 and 59a arranged radially on the base plate 61' so that a large number of the disc holder assemblies 19 may be circumferentially arranged about the center of the base plate 61. The extending rearward leg portion 50 of the clamp arm 46 passes through the bottom of the support 55 by being inserted into the through hole 58 as the clamp assembly is erected on the base 61. The operation finger 51 of the clamp arm 46 penetrates through the square aperture 51a of the base plate 61 and protrudes beyond the underside of the base plate as seen in FIG. 16.

As seen in FIG. 16, a disc 15 is held or gripped between the clamp arm 46 and the support 55. In this condition if the operating finger 51, which protrudes beneath the base plate 61 is moved in the direction shown in the arrow F-F', the forward portion 48 of the clamp arm 46 is rotated about the pivot shaft 49 in the clockwise or counter clockwise direction allowing the center aperture 15a of the disc to be engaged or disengaged with the convex portion 47. The spring 54 enables a resilient bias to be applied to the rear surface 55a of the associated disc support. Thus, if the operating finger 51 of the clamp arm 46 is pulled in the direction shown by the arrow F the convex portion 47 formed at the tip end of the clamp 46 is rotated about the shaft 49 in the clockwise direction forming a space between the associated disc support and the clamp arm 46 for the insertion of the disc 15. If on the other hand the operating finger 51 is released, the biasing force created by the spring 54 causes the convex portion 47 to move against the associated support and it will move into the center aperture 15a of the disc 15 should one be placed therebetween.

Since the elements of the holder assembly 19, i.e. the clamp arm 46 and the disc support 55, are preferably made of synthetic resin material they can be freely and easily be mounted on or dismantled from the base plate 61. Since spring force can be easily generated by this synthetic resinous material, the spring 54 can be made integral with the remaining structure. On the other hand, the use of the metals hereinbefore described for the spring 54 can also be made in an easy manner and attached to the resinous material. The construction of the disc holder assembly 19 as hereinbefore described, permits a large number of these assemblies to be placed on the base plate 61 resulting in quite high density of disc storage capacity.

Figure 18:
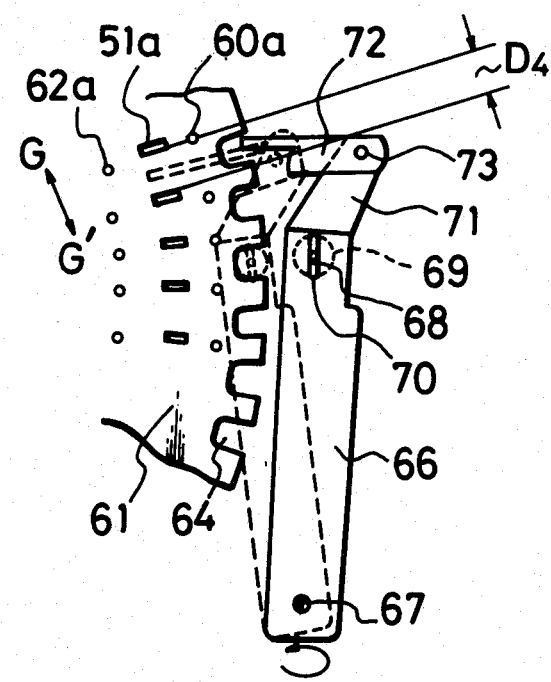
FIG. 18 is a plan view showing the relationship of the release lever and the position restricting roller of the present invention.
Figure 17:
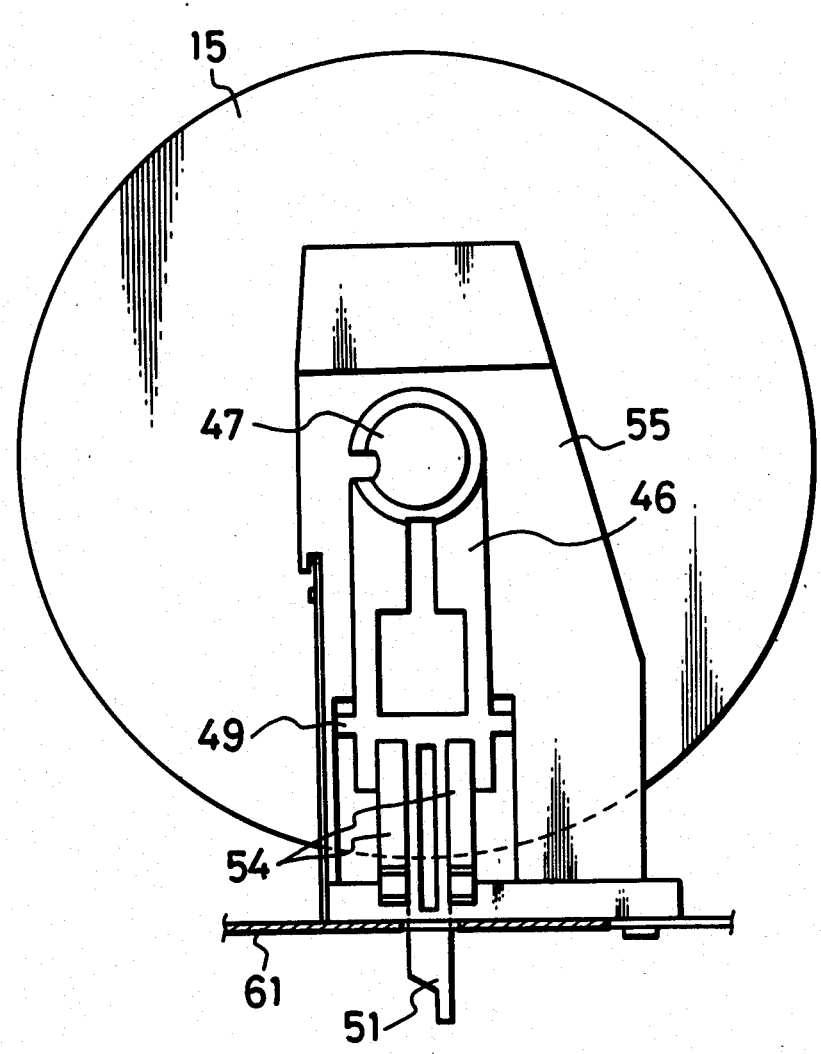
FIG. 17 is a front view of the disc clamper of the present invention taken along line XVII—XVII of FIG. 16.

FIG. 18 illustrates the manner in which the base plate 61 of the carousel A can be rotatably indexed and the discs released. As seen in this figure, the peripheral edge of the base 61 is provided with a plurality of grooves 64, the number of which corresponds to the number of discs 15 to be stored on the base plate 61. Mounted externally of the base plate 61 is a lever 66 which is pivoted about a pin 67 journalled in appropriate portion of the chassis. The lever 66 is movable in a counterclockwise direction by a driving means such as a solenoid or the like, not shown. A roller 69 is journalled about pin 68 at the free end of the lever 66. The roller 69 is adapted to fit into the selected one of the grooves 64 upon its movement in the counter-clockwise direction, as indicated by the broken line. The pin 68 is slidable along a small elliptic slit 70 formed through the lever 66 which extends in the longitudinal direction of the lever. A sub-arm 71 is fixed at the free end of the lever 66 to be pivotable together. At the tip end of the sub-arm 71 there is pivotally mounted a releasing lever 72 which is adapted to engage with and move the operating finger 51 of the clamping arm 46 in the direction G' so as to initate opening or release of the clamping arm 46 as previously described.

The releasing lever 72 is journalled about pivot shaft 73. When the tip end of the releasing lever 72 is inserted into the space before defined between the operating members of a pair of adjoining clamping arms 46, as shown by the broken line, the releasing lever is moved within the space before so as to release the disc from its engagement between the clamping arm 46 and the support 55.

According to the above construction, the releasing lever 72 is simultaneously operated in gang with the position guide lever 66 which constitutes the rotating mechanism for the base plate 61. Thus, it is not necessary to provide independently and separately a releasing lever nor to have separate means for operating the releasing lever. Thus, the mechanism therefore may be simplified.

Figure 19:
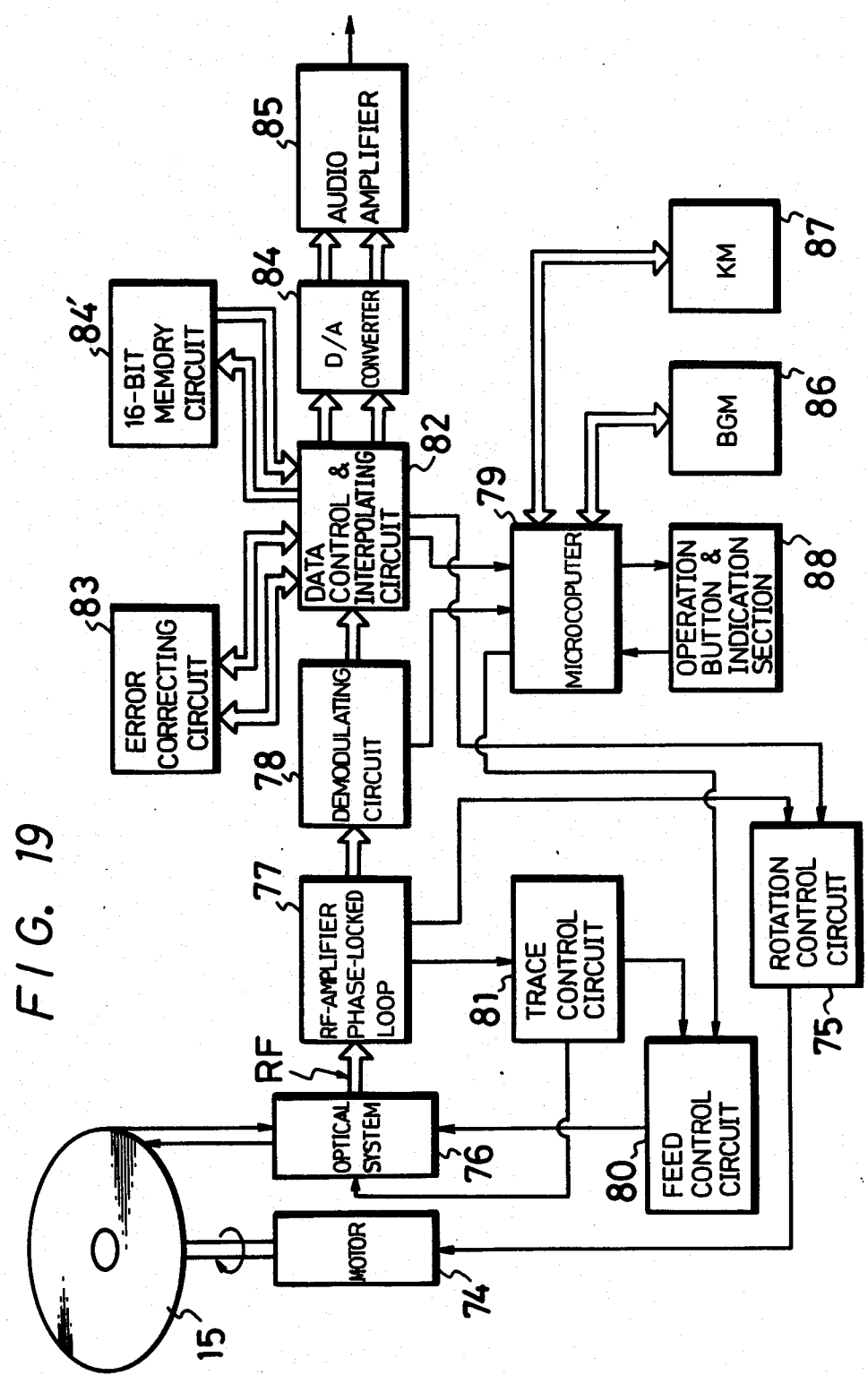
FIG. 19 is a block diagram of the disc player system according to the present invention.

In general, the disc player apparatus is usually placed into a non-playing mode, after all of the requested programs have been played. However, since the disc player apparatus contains a great deal of information, it is considered better, in practice, to use such information in other ways. Therefore, the present invention also has as its object the provision of an improved disc player apparatus in which there may be superimposed, as for example, upon a "KARAOKE" (a musical system in which a recording medium such as a disc on which is mainly recorded instrumental accompaniment is reproduced and a singer's voice corresponding to the accompaniment can be mixed therewith and recorded through an internal microphone) when the disc is in the play mode. According to this embodiment, the presence or absence of the approaching KARAOKE music is detected and when the absence for requested accompaniment or vocalization is detected, the music play mode is automatically changed to a background music play mode. This embodiment is described and shown with reference to FIGS. 19 and 20. In FIG. 19, a disc 15 such as a DAD (digital audio disc) the pits of which are detected optically, is rotated by a drive motor 74 controlled by a rotation control circuit 75. An optical reading system 76 which includes an optical pickup and a mechanism for moving the optical pickup in the radial direction of the disc 15 is controlled by a feed control circuit 80. The feed control circuit is in turn controlled by a micro computer 79 and a trace control circuit 81 which is itself controlled by a signal from a radio frequency amplifier and PLL (phasea locked loop) circuit 77. The output from the radio frequency amplifier and PLL circuit 79 is fed through a demodulating circuit 78 through a data control and interpolation circuit 82. From the data control and interpolation circuit 82, control data is supplied through bus lines to an error correcting circuit 83 and a 16 bit memory circuit 84', whereby the data is interpolated. The control outputs from the demodulating circuit 78 and the data control and interpolating circuit 82 are both supplied to the microcomputer 79. The output from the data control and interpolating circuit 82 is also supplied through a D/A (digital-to-analog) converter 84 and an audio amplifier 85 for reproduction. A pair of memories 86 and 87, the memory 86 being for background music (and will hereinafter be called BGM for simplicity), while the memory 87 is for the KARAOKE music (this will hereinafter be called KM for simplicity) each of the memories being provided in relation to the microcomputer 79 so as to receive and feed information from and to the microcomputer. Stored on the disc 15 at its record addresses (0th to 99th, for example) are the theme or the desired music of the establishment which installs the apparatus and the record addresses are memorized in the BGM 86. Stored in the KM 87 are the record addresses of about 10 requested musical programs. Reference numeral 88 designates an operation button and an indications section for manual operation.

Figure 20:
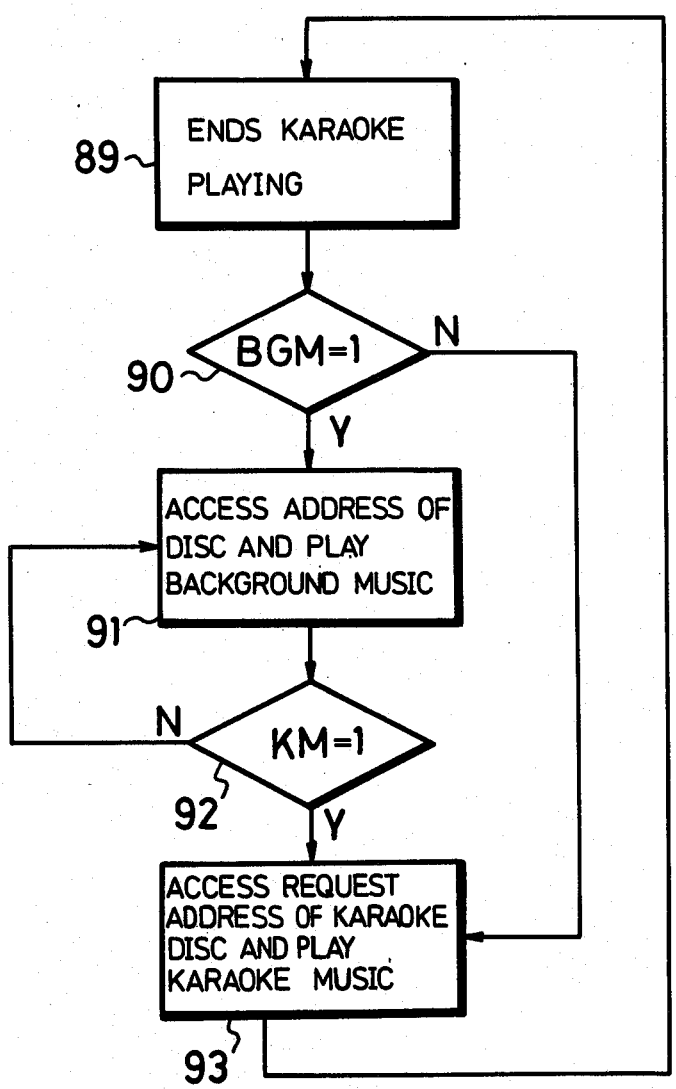
FIG. 20 is a flow chart illustrating the operation of the disc player system.

The operation of the disc player apparatus thus shown will be obvious from the flow chart of FIG. 20. At step 89, the microcomputer 79 detects when the disc reproducing apparatus has just finished a so-called KARAOKE or that there is no further request program. At the step 90, the microcomputer 79 detects whether a particular disc address is stored in the BGM 86, namely BGM 86="1", or not. If not, the computer advances to the processing step 93 in which the address of the requested music stored in the music or KARAOKE disc is accessible from the KM memory 87. If so, the corresponding music is played. If BGM="1", or yes, the processing step advances to step 91 in which the address of the disc desired is accessed from the BGM 86 and the disc player apparatus is set in the playing mode to play the background music. At the step 92, detection is made as to whether the KM 87 is accessed by the request address of the KARAOKE disc while playing the background music or not. If yes, the processing step 92 advances to step 93 in which the requested address of the KARAOKE disc is accessed and the disc player apparatus is set in the playing mode of the requested KARAOKE Music. If not, the disc address of the BGM 86 is accessed and the disc reproducing apparatus is put into the playing mode of the background music. If the KM memory 87 and the BGM memory 86 both show "0", the disc player apparatus is set in the non-playing mode. If the shop or installation wherein the apparatus is installed enjoys a wire broadcast facility, i.e., radio facility, the disc reproducing apparatus is automatically changed into the wire broadcasting mode.

Figure 21:
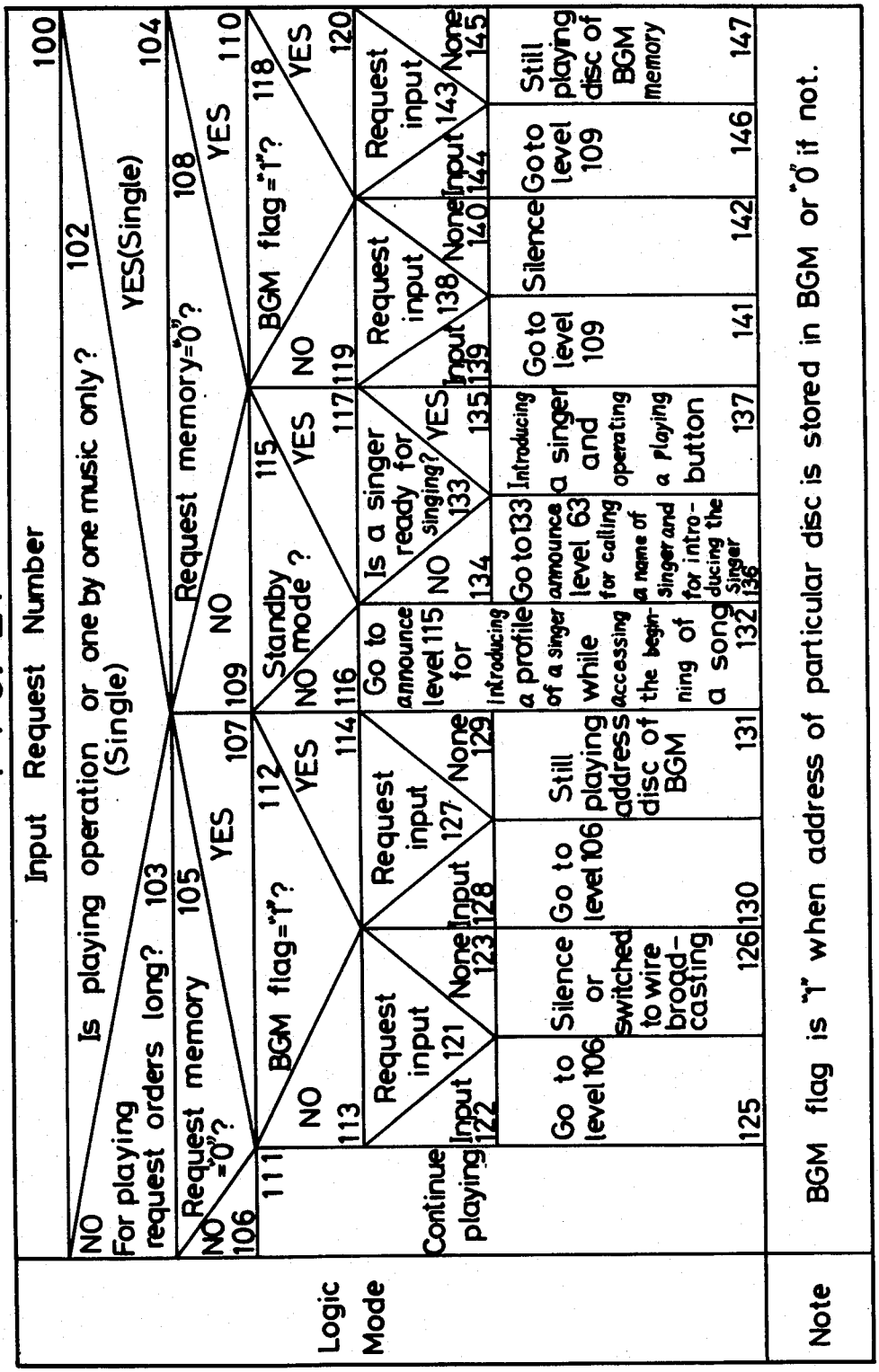
FIG. 21 is an operational table explaining the disc player system.

When the address of the requested music is input, the disc reproducing appartus is put into the KARAOKE mode. A logic mode for playing music one by one, i.e., single discs, and sequential playing of requested orders (plural discs) is shown on the table in FIG. 21. With the above, it is possible to automatically play background music during non-playing time, except during the KARAOKE playing time. Moreover, the apparatus can be made so that the number of revolutions per unit time of its turntable is variable while being capable of automatically offering the normal number of revolutions at the next operation.

In the prior art, there had been proposed disc player apparatus which can vary the number of revolutions per unit time of its turntable by an amount of about 10 percent. According to the present apparatus, in addition to making the number of revolutions per unit time coincident with normal use, in order that the pitch (tone) of the sound reproduced from the disc is made coincident with that of the original music, or when an amatuer sings a song using KARAOKE disc or the like, the interval of the singer can be made coincident with that of the musical instrument by raising or lowering the speed of the turntable. With the above disc player apparatus, when a subsequent singer wishes to record a song, the present state of the music interval, namely, the number of revolutions of the turntable is not known, it is thus possible that the previous singer had varied the number of revolutions so as to obtained for him a matched interval, which interval is not desired by the subsequent singer. Accordingly, the operator of the disc-reproducing apparatus has a great deal of trouble in order to correct the number of revolutions of the turntable to the predetermined or normal one for the subsequent user.

Figure 22:
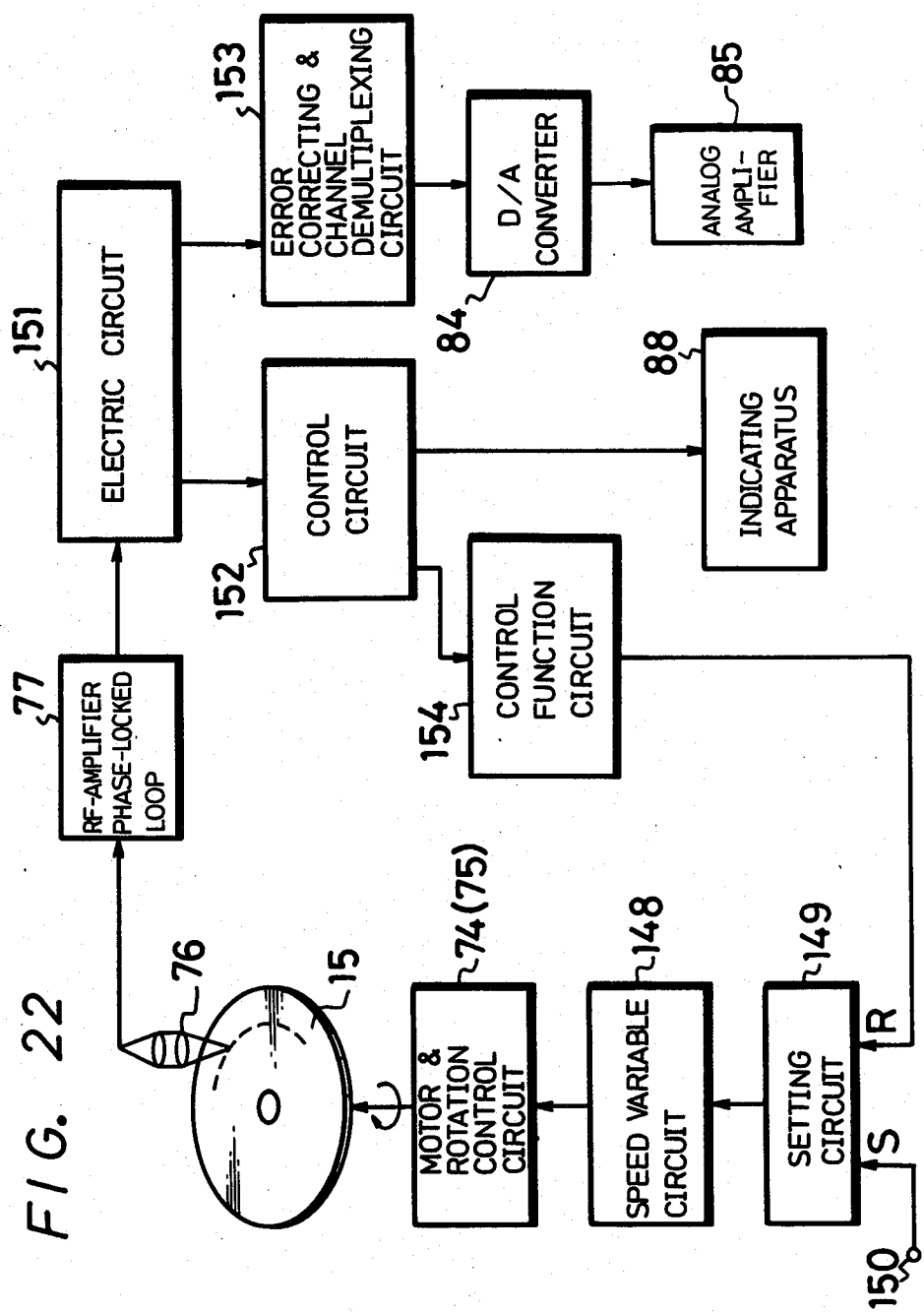
FIG. 22 is a block diagram showing another embodiment of the disc player system.

FIG. 22 is a block diagram showing how the foregoing difficulties can be avoided using the present invention. In the present invention, a program is selected at random from many programs (usually 15 programs) recorded on the DAD 15 and the selected KARAOKE playing is performed. The DAD 15 is servo-controlled by the motor 74 and a rotation control circuit 75 to thereby rotate at a predetermined speed. A speed variable circuit 148 is provided including, for example, a counter circuit capable of varying the reference speed applied to the rotation control circuit 75 so as to vary the speed within a range of ]percent to −9 percent. A setting circuit 149, for setting the speed to the set terminal S to which an operation input setting signal is applied through an input terminal 150. The optical system provided includes the optical pickup 24 shown in FIG. 6. The signal from the optical pickup 24, in the optical system 76 is supplied through an RF-amplifier and PLL circuit 77 to an electric circuit 151 which includes a pit detecting circuit, a clock generating circuit, a synchronous detecting circuit and a demodulating circuit. The output from electric circuit 151 is supplied to an error correcting and channel demultiplexing circuit 153. The output from the error correcting and channel demultiplexing circuit 153 is supplied to a D/A (digital-to-analog) converting circuit 84 from which the analog output is derived and then fed to an analog amplifier 85. The output from a control circuit 152 together with the input from the electric circuit 151 is supplied to an indicating apparatus 88 and the signal function circuit 154 so that a playing time or the like is indicated on the indicating apparatus 88 and that the signal from the control function circuit 154 is applied to the reset terminal R of the setting circuit 149.

Through the operation of the control function circuit 154, the counter, the speed of which is preliminarily setby the P channel signal (which is recorded on the DAD 15 as a user channel) of the sub-channel recorded or the signal of the changing point of the track number (track number changes from 0.1 to 0.2) recorded on the DAD 15 is reset. Accordingly, when the rotation speed of the turntable is varied in response to the former user, of the KARAOKE playing mode or the like, it is automatically restored to the predetermined reference rotation speed during the interval in changing over to the next music program. Thus, it is possible to provide a disc player apparatus which is capable or removing the troublesome problems arising from variation in the revolution number of the turntable and by providing for the automatic return of the disc player apparatus to normal revolution.

The above description provides the preferred embodiments of the present invention. It will be apparent that many modifications and variations could be affected by one skilled in the art without departing from the spirit or scope of the concepts of the invention. Accordingly, it is intended that the scope of the present invention should be appended only by the appended claims.

We claim as our invention

1. A disc transport system for selectively supplying discs to a playback apparatus comprising:
    a. a carousel carrying a plurality of discs;
    b. means for rotating said carousel such that a disc to be selected from said plurality of disc arrives at a predetermined position;
    c. transfer means for transferring said selected disc at the predetermined position from said carousel to said playback apparatus and vice-versa; and
    d. drive means for driving said transfer means for said carousel to said playback apparatus and vice-versa; said carousel comprising
    a disc-shaped base and a plurality of disc clampers located on said disc-shaped base in a radial direction along a periphery of said base,
    each of said disc clampers being formed of a disc support and a clamper member supported by a bearing provided on said disc support and having a convex portion adapted to engage with the bore of said disc,
    a spring member for biasing said convex portion of said clamper members engaging the bore of said disc against said disc support, and
    an operation member for disengaging said convex portion from the bore of said disc against the bias of said spring member to release said disc from said carousel for transfer to said playback apparatus.

2. The disc transport system according to claim 1, in which said transfer means comprising:
    a. a slider;
    b. first and second arms pivoted to said slider;
    c. stop means provided at substantially the center between said carousel and said playback apparatus including means for pivoting said arms; and
    d. spring means for biasing said first and second arms toward each other to grip said disc therebetween;
    e. means for moving said slider to a position in front of said carousel to select one of said discs from said carousel,
    said slider and said stop means being arranged so that when slider is moved in front of said carousel said second arm is located outside the outer periphery of the disc held thereon and said first arm is engaged with said stopper and inclined outside the outer periphery of the disc against the bias of said spring, and when said slider is moved toward said playback apparatus, said first arm is returned from its pivoted state by the spring bias to grip the disc between said first and second arm whereby said disc may be removed from said clamper and transferred to its playback position, said slider and stop means being further arranged so that in the playback position said second arm engages with said stopper and when said slider is moved further said second arm is pivoted toward the outer periphery of said disc against the spring bias and said first arm is also positioned outside said disc whereby said disc may be placed on said disc playback apparatus.

3. The disc transport system according to claim 2, in which said drive means for said slider includes a plurality of drive gears spaced along the slider said space being centered at substantially the center of said transfer means, said slider being formed with a gear rack thereon meshing with said plurality of gears, to thereby move said slider, the moving length of said slider being the sum of twice the length of the rack of said slider and the distance between said plurality of said drive gears.

4. The disc transport system according to claim 1, including means for rotating and arresting the carousel so that a disc to be played is selected from said plurality of discs on said carousel in a horizontal state, and thereafter pressing said operation member against the spring force by the spring member to release the engagement of said selected disc with its clamper to hold said selected disc horizontal on the disc clamper.

5. The disc transport system according to claim 1, including rollers pivotally mounted at the ends of said first and second arms, and said transfer means includes a U-shaped guide groove whereby the selected discs is transferred from said carousel to said disc playback apparatus by pushing the edge of said disc by said rollers being guided by said disc guide groove.

* * * * *